(12) United States Patent
Dylewski, II

(10) Patent No.: US 12,741,518 B2
(45) Date of Patent: Sep. 22, 2026

(54) BULKHEAD CLAMP ASSEMBLY

(71) Applicant: Leer Group, Elkhart, IN (US)

(72) Inventor: Eugene A. Dylewski, II, Granger, IN (US)

(73) Assignee: Truck Accessories Group, LLC, Elkhart, IN (US)

( * ) Notice: Subject to any disclaimer, the term of this patent is extended or adjusted under 35 U.S.C. 154(b) by 615 days.

(21) Appl. No.: 18/184,125

(22) Filed: Mar. 15, 2023

(65) Prior Publication Data

US 2023/0294496 A1 Sep. 21, 2023

Related U.S. Application Data

(60) Provisional application No. 63/321,350, filed on Mar. 18, 2022.

(51) Int. Cl.
*B60J 7/14* (2006.01)

(52) U.S. Cl.
CPC .................................... *B60J 7/141* (2013.01)

(58) Field of Classification Search
CPC ................................. B60J 7/141; B60J 7/198
USPC .................................................... 296/100.09
See application file for complete search history.

(56) References Cited

U.S. PATENT DOCUMENTS 6,257,647 B1 7/2001 Ninness et al.
7,258,387 B2 * 8/2007 Weldy ..................... B60J 7/198 296/100.07
10,315,498 B2 * 6/2019 Parkey ..................... B60J 7/198
11,059,359 B2 * 7/2021 Dylewski, II ............ B60J 7/141
2016/0096422 A1 4/2016 Facchinello et al.
2019/0084388 A1 3/2019 Zheng et al.
2019/0105974 A1 4/2019 Parkey
2020/0062095 A1 2/2020 Xu
2020/0108702 A1 4/2020 Dylweski, II et al.
2021/0170846 A1 6/2021 Cao
2023/0256800 A1 * 8/2023 Dylewski, II ............ B60J 7/198 296/100.17
2023/0415553 A1 * 12/2023 Dylewski, II ............. F16B 2/02
2025/0050718 A1 * 2/2025 Dylewski, II .......... B60J 7/1607
2025/0144986 A1 * 5/2025 Zheng ...................... B60J 7/198
2025/0153552 A1 * 5/2025 Xu .......................... B60J 7/198

OTHER PUBLICATIONS

International Search & Written Opinion; Date of Mailing Jun. 16, 2023; PCT/US2023/015438; Leer Group; "Bulkhead Clamp Assembly".

* cited by examiner

*Primary Examiner* — Jason S Morrow
(74) *Attorney, Agent, or Firm* — Barnes & Thornburg LLP

(57) ABSTRACT

A bulkhead panel clamp for a tonneau cover assembly is provided. The bulkhead panel clamp includes a clamp, a flange, and a tab. The clamp body with a hook is located at one end of the clamp body. The flange is located adjacent to and extends in an opposite direction of the hook. The tab is located on the clamp body spaced apart from the hook. The tab also extends away from the clamp body that is in a direction opposite from the flange. The hook is configured to engage a rail and the clamp body is configured to be supported by a bulkhead panel portion of the tonneau cover assembly when the bulkhead panel clamp is in an unclamped position.

9 Claims, 7 Drawing Sheets

BULKHEAD CLAMP ASSEMBLY

RELATED APPLICATIONS

The present Application relates to and claims priority to U.S. Provisional Patent Application, Ser. No. 63/321,350, filed on Mar. 18, 2022. The subject matter disclosed in that Provisional Application is hereby expressly incorporated into the present Application.

TECHNICAL FIELD AND SUMMARY

The present disclosure relates to pickup trucks and truck beds or cargo boxes, and, in particular, cargo box covers also known as tonneau covers, used on such cargo boxes that include a bulkhead panel clamp assembly.

Tonneau covers are truck bed or cargo box covers that provide a covering for a truck bed when used in combination with the truck's sidewalls and tailgate. Covering the bed of a pickup truck helps create a secure compartment where items may be stored out of view when the tailgate is in an upright and latched position. Embodiments of a tonneau cover may include the cover portion that is suspended over the truck bed between the sidewalls. Also, a rail assembly may be employed that attaches to the opposing sidewalls to secure the cover onto the truck.

The bulkhead panel portion of the tonneau cover is typically the forward most panel located at the bulkhead end of the cargo box adjacent the cab. Typically, the bulkhead panel is secured to the walls of the cargo box or to rails which themselves are secured to the walls of the cargo box. With this securement, the one or more folding panels of the tonneau cover are movable relative to the bulkhead panel. These one or more folding panels selectively latch to the cargo box and open or close while the bulkhead panel remains secured thereto.

An illustrative embodiment of the present disclosure provides a bulkhead panel clamp for a tonneau cover assembly. The bulkhead panel clamp includes a clamp, a flange, and a tab. The clamp body with a hook is located at one end of the clamp body. The flange is located adjacent to and extends in an opposite direction of the hook. The tab is located on the clamp body spaced apart from the hook. The tab also extends away from the clamp body that is in a direction opposite from the flange. The hook is configured to engage a rail and the clamp body is configured to be supported by a bulkhead panel portion of the tonneau cover assembly when the bulkhead panel clamp is in an unclamped position.

In the above and other embodiments, the bulkhead panel clamp may further comprise: a post that extends through the clamp body and is configured to be supported by the bulkhead panel portion of the tonneau cover assembly when in the unclamped position; the flange extends downwardly away from an underside of the bulkhead panel portion and underneath the hook to limit lateral movement of the clamp body; the tab extends from a planar surface of the clamp body and engages an underside of the bulkhead panel portion when the bulkhead panel clamp is in a clamped position, and to create space between the planar surface of the clamp body and the underside of the bulkhead panel portion; a threaded member that threads onto the post and supports the clamp body when the bulkhead panel clamp is in the unclamped position; the threaded member is selected from the group consisting of a knob and a nut; and a wingnut that threads onto the post adjacent the threaded member.

Another illustrative embodiment of the present disclosure provides a bulkhead panel clamp for a tonneau cover assembly. The bulkhead panel clamp includes a clamp, a post, a knob, a flange, and a tab. The clamp body includes a hook located at one end of the clamp body and a bore disposed through a planar portion of the clamp body. The post includes a longitudinally extending threaded body and a head at one end of the longitudinally extending threaded body that is wider than the longitudinally extending threaded body. The longitudinally extending threaded body of the post extends through the bore of the clamp body. The knob includes a threaded bore corresponding to threads on the longitudinally extending threaded body of the post. The knob also rotates on the longitudinally extending threaded body of the post to move linearly along the longitudinally extending threaded body of the post. The head of the post is configured to be received in an opening formed within an underside of a bulkhead panel. The knob is configured to move the clamp body either toward or away from the underside of the bulkhead panel. The flange is located adjacent to and extends in an opposite direction of the hook. The tab is located on the clamp body spaced apart from the hook. The tab also extends away from the clamp body that is in a direction opposite from the flange.

In the above and other embodiments, the bulkhead panel clamp may further comprise: the hook being configured to engage a rail and the clamp body being configured to be supported by a bulkhead panel portion of the tonneau cover assembly when the bulkhead panel clamp is in an unclamped position; the tab extends from the planar portion of the clamp body and engage the underside of the bulkhead panel when the bulkhead panel clamp is in a clamped position, and to create space between the planar portion of the clamp body and the underside of the bulkhead panel; and the flange extends downwardly away from the underside of the bulkhead panel and underneath the hook to limit lateral movement of the clamp body.

Additional features and advantages of the bulkhead clamp assembly will become apparent to those skilled in the art upon consideration of the following detail description of the illustrated embodiments exemplifying carrying out the bulkhead clamp assembly as presently perceived.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of the bulkhead clamp assembly, and such exemplification is not to be construed as limiting the scope of the bulkhead clamp assembly in any manner.

DETAIL DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a bulkhead panel clamp assembly configured to secure the bulkhead panel of a tonneau cover to a tonneau cover rail or a cargo box sidewall. A fastener or other like structure may be disposed in a slot on the underside of the bulkhead panel adjacent its lateral side. The fastener is supported in the slot. A clamp member includes a bore disposed therethrough to receive the fastener. The clamp member is supported by a knob, nut, wingnut, and/or other like structure or structures. The clamp member may be suspended underneath the bulkhead panel by the fastener post and knob while in the unclamped position. It is appreciated that the opening on the underside of the bulkhead panel may be a slot so the fastener, along with the clamp member, may be moved laterally to and from the lateral side of the bulkhead panel. When installing the bulkhead panel onto the cargo box sidewall, the clamp member, supported by the knob, can be moved toward a rail that lines the top interior edge of the cargo box sidewall. An upward extending flange of the clamp member may engage a portion of the rail. The knob can then be rotated to move linearly toward the underside of the bulkhead panel to secure the clamp to the rail.

Figure 1:
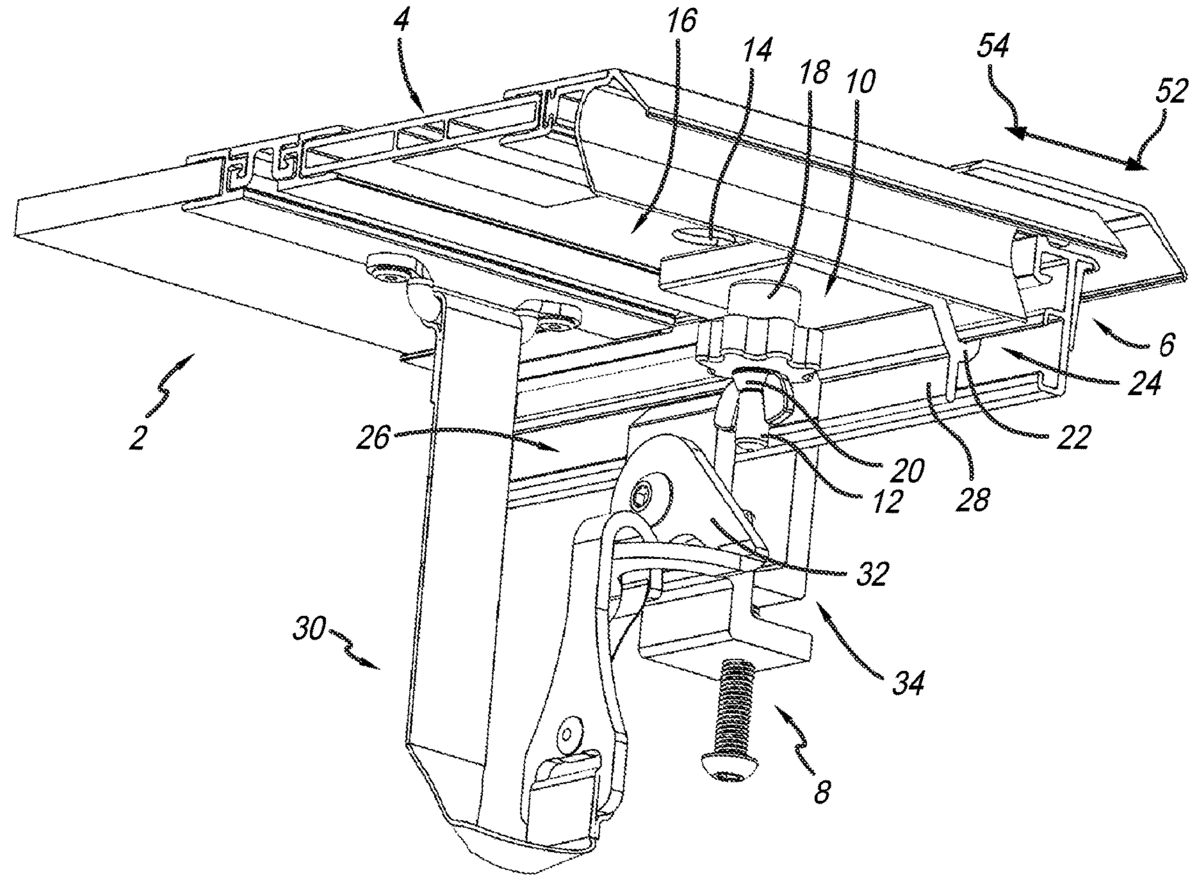
FIG. 1 is an underside detail perspective view of a portion of a bulkhead panel, rail, and clamp assembly of a tonneau cover assembly.

An underside perspective detail view of a portion of a bulkhead panel 4, rail 6, and clamp assembly 8 of a tonneau cover assembly 2 is shown in FIG. 1. Illustratively, rail 6 is intended to be clamped to the upper interior sidewall of a cargo box (not shown) using clamp assembly 8. It is appreciated that a rail can be attached to each sidewall of the cargo box. Each rail allows the panels of the tonneau cover to latch thereto for securing the tonneau cover to the cargo box. Also shown in this view is a bulkhead panel clamp member 10 that secures bulkhead panel 4 to rail 6. In order to accomplish this, a fastener post 12 is fitted into a keyhole slot 14 formed on underside 16 of bulkhead panel 4. Bulkhead panel clamp member 10 receives fastener post 12 and is positioned adjacent underside 16 of bulkhead panel 4. By rotating knob 18, it will move bulkhead panel clamp member 10 linearly either toward or away from underside 16 of bulkhead panel 4. It is appreciated that other like means, such as a nut, swage, or other similarly functioning fastening structure, may be employed in place of or in addition to knob 18 to move bulkhead panel clamp member 10 up and down on fastener post 12. In the illustrated embodiment, a wingnut 20 is positioned adjacent knob 18 to limit movement of same.

As further depicted in this view, bulkhead panel clamp member 10 includes a clamp hook 22 that can be positioned to be received in a rail hook 24 of clamp slot 26 of rail 6. It is appreciated that bulkhead panel clamp member 10 is movable relative to bulkhead panel 4 toward and away from its lateral end. When installing tonneau cover assembly 2, bulkhead panel 4 may be positioned on the cargo box sidewall so the bulkhead panel clamp member 10 is located adjacent rail 6. Bulkhead panel clamp member 10, supported by knob 18 or a nut, can be slid toward rail 6 until clamp hook 22 is positioned underneath rail hook 24 (see, also, FIGS. 5 and 6). Knob 18 or a nut may then be rotated to move bulkhead panel clamp member 10 towards the underside of bulkhead panel 4 so clamp hook 22 engages and tightens on rail hook 24 (see, also, FIG. 7). This secures bulkhead panel 4 to rail 6. Illustratively, a clamp flange 28 may extend from bulkhead panel clamp member 10 to limit the extent to which bulkhead panel clamp member 10 moves laterally towards rail 6. Also shown in this view is a tether assembly 30 that hooks onto a tie-down ring 32 which is fastened to the clamp assembly 34.

Figure 2:
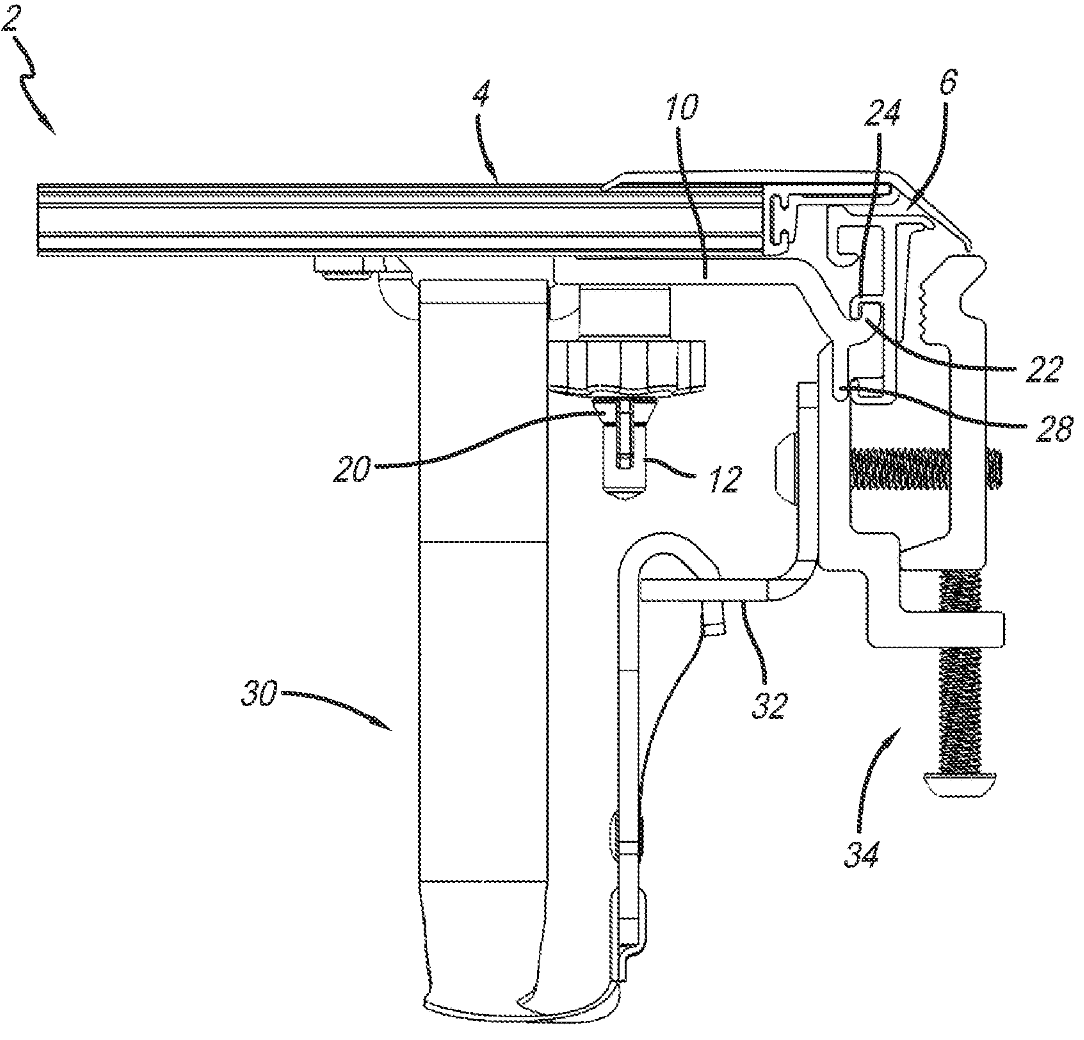
FIG. 2 is a front detail view of a portion of the bulkhead panel and rail of the tonneau cover assembly.

A front detail view of a portion of bulkhead panel 4 of tonneau cover assembly 2, along with rail 6, clamp assembly 34, tether assembly 30, and bulkhead panel clamp member 10, are shown in FIG. 2. Like the view in FIG. 1, the view in FIG. 2 depicts clamp hook 22 from bulkhead panel clamp member 10 engaging rail hook 24 of rail 6. Knob 18 is tightened on fastener post 12 and against bulkhead panel clamp member 10. Fastener post 12 is also fitted into keyhole slot 14 (see FIG. 1) of the underside of bulkhead panel 4 to clamp bulkhead panel 4 to rail 6 with bulkhead panel clamp member 10. Also demonstrated in this view is how clamp flange 28 limits lateral movement of bulkhead panel clamp member 10 towards rail 6.

Figure 3:
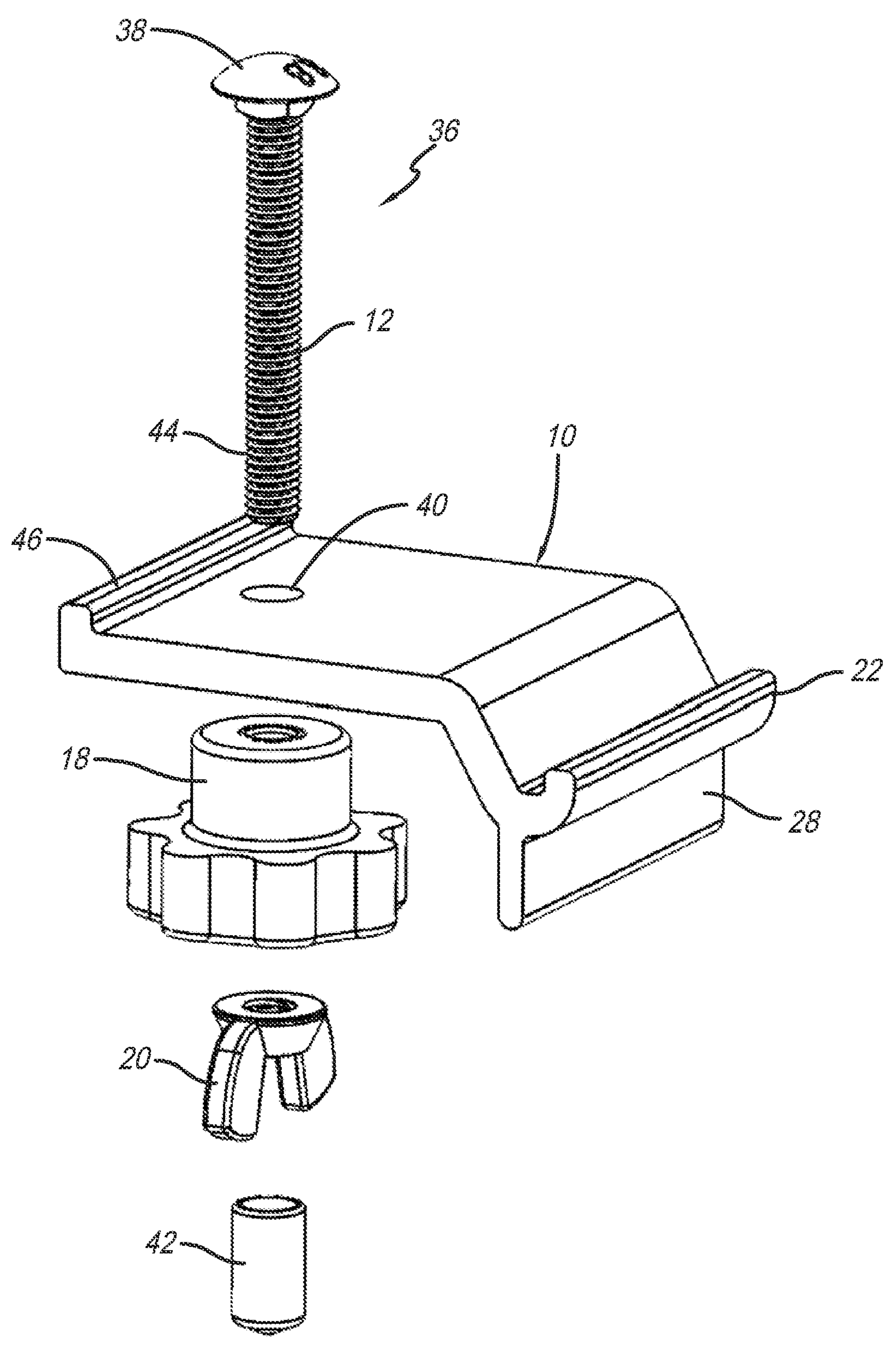
FIG. 3 is an exploded view of a bulkhead panel clamp member assembly.

An exploded view of the bulkhead panel clamp member 10, along with fastener 36 and knob 18, are shown in FIG. 3. Fastener 36 includes head 38 and fastener post 12. Head 38 is fitted into keyhole slot 14 (see, also, FIG. 4) to allow fastener post 12 to slide there along. A bore 40 is disposed through bulkhead panel clamp member 10, which receives fastener post 12 therethrough. Knob 18 includes corresponding threads to thread onto fastener post 12 and is positioned on the underside of bulkhead panel clamp member 10 for purposes of moving same up and down along fastener post 12. Wingnut 20 may be positioned adjacent knob 18 to limit movement of same on fastener post 12. A post cap 42 may optionally fit on end 44 of fastener post 12 as desired.

Further shown in this view is clamp hook 22 and clamp flange 28 extending from bulkhead panel clamp member 10. A tab 46 extends upwardly from bulkhead panel clamp member 10 for engaging underside 16 of bulkhead panel 4 when bulkhead panel clamp member 10 is clamped to rail 6 (see FIG. 1).

Figure 4:
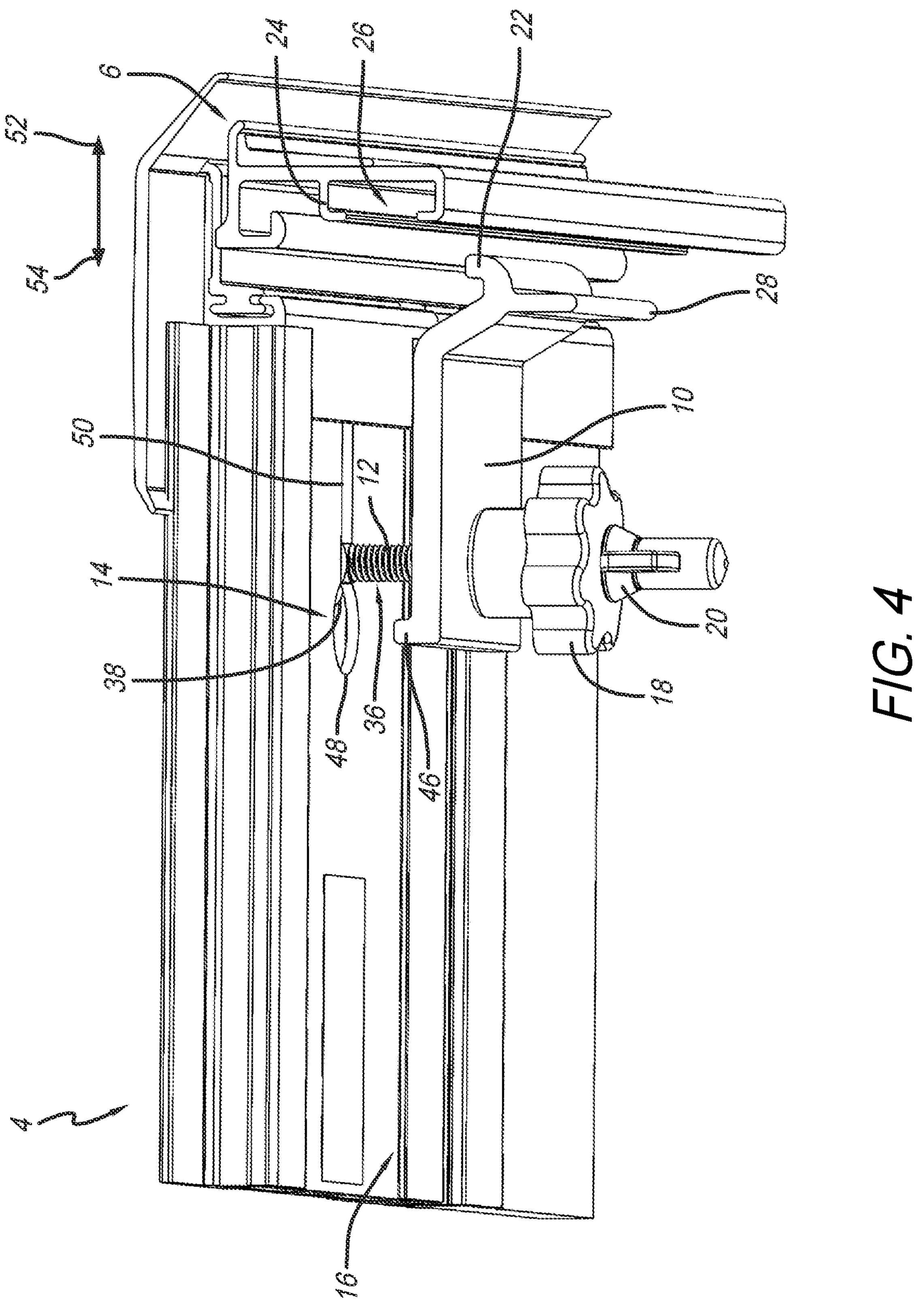
FIG. 4 is a perspective underside detail view of the bulkhead panel and rail.

Another perspective underside detail view of bulkhead panel 4 and rail 6 is shown in FIG. 4. This view depicts bulkhead panel clamp member 10 being supported by bulkhead panel 4 prior to bulkhead panel clamp member 10 clamping onto rail 6. Keyhole slot 14 formed on underside 16 of bulkhead panel 4 receives head 38 of fastener 36 at an enlarged region 48. Fastener 36 is then able to travel along slot region 50 of keyhole slot 14 in directions toward 52 or away 54 from rail 6.

Figure 5:
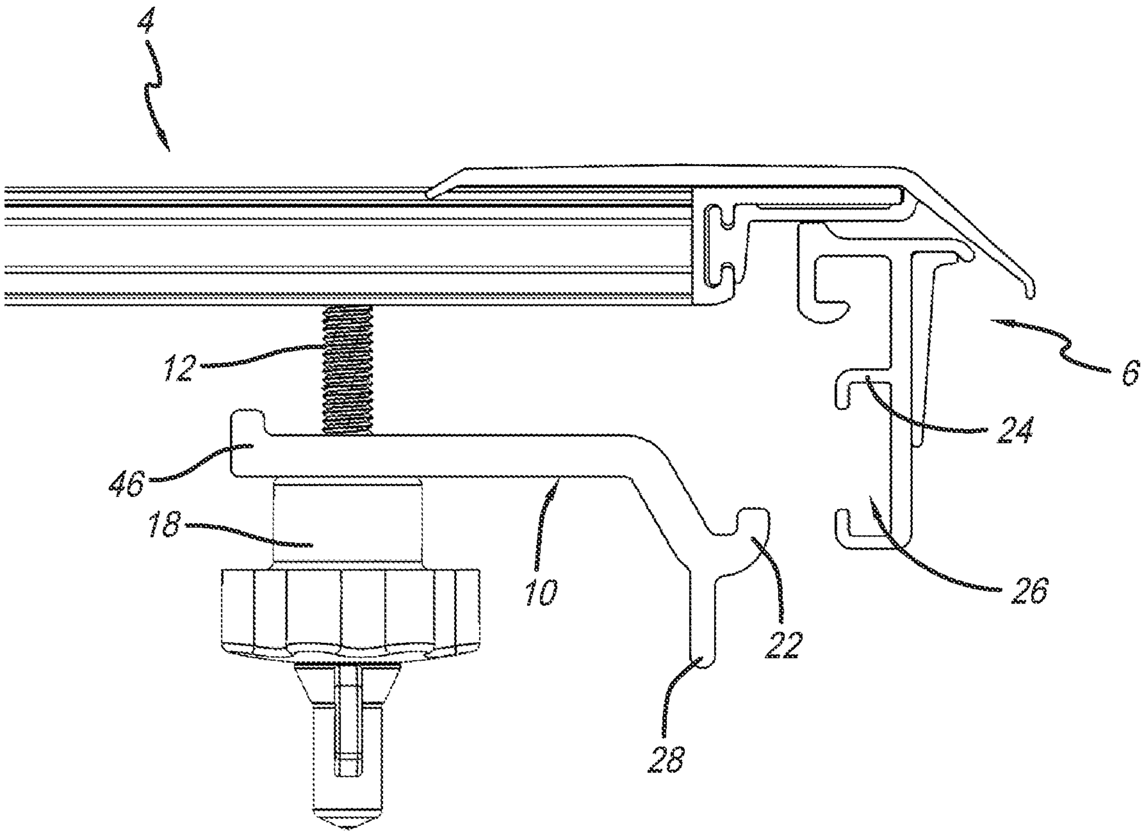
FIG. 5 is a front detail view of a portion of the bulkhead panel and rail of the tonneau cover assembly.
Figure 6:
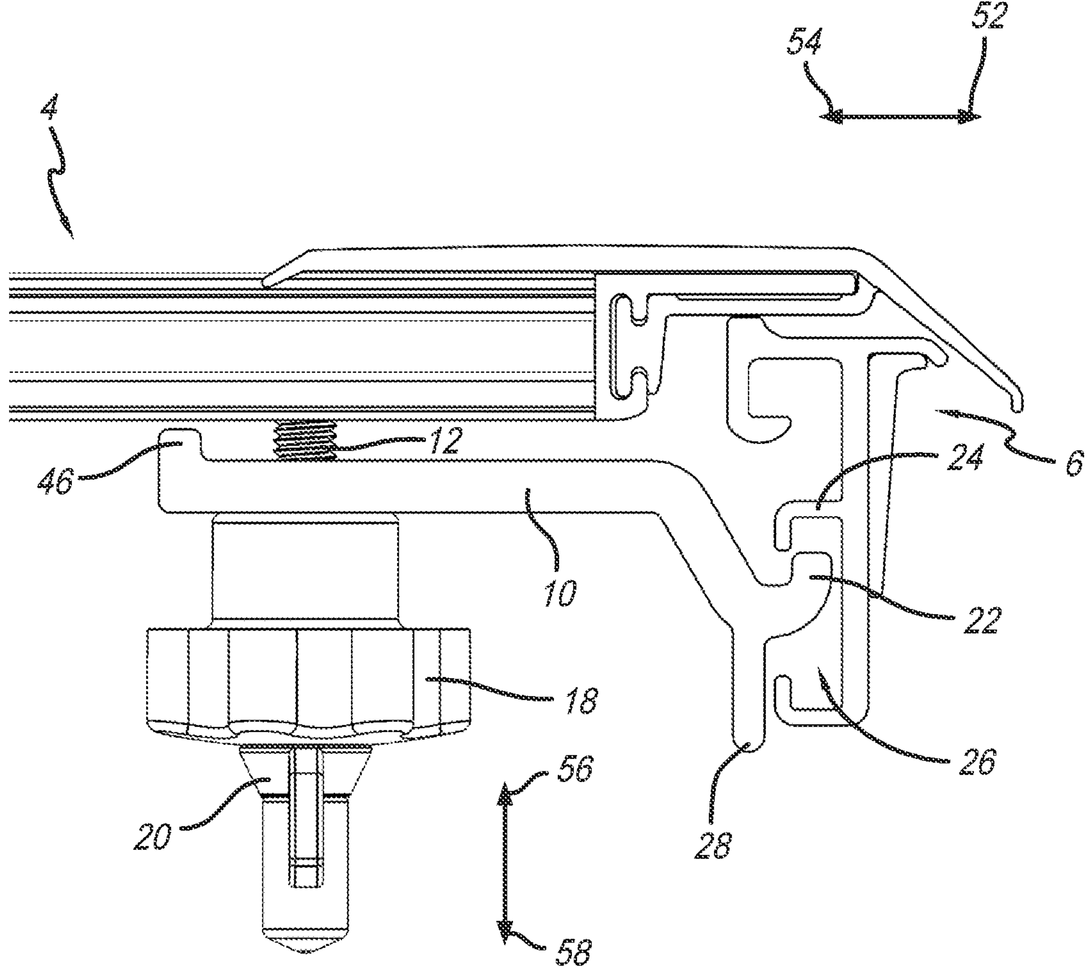
FIG. 6 is another front detail view of a portion of the bulkhead panel and rail of the tonneau cover assembly.
Figure 7:
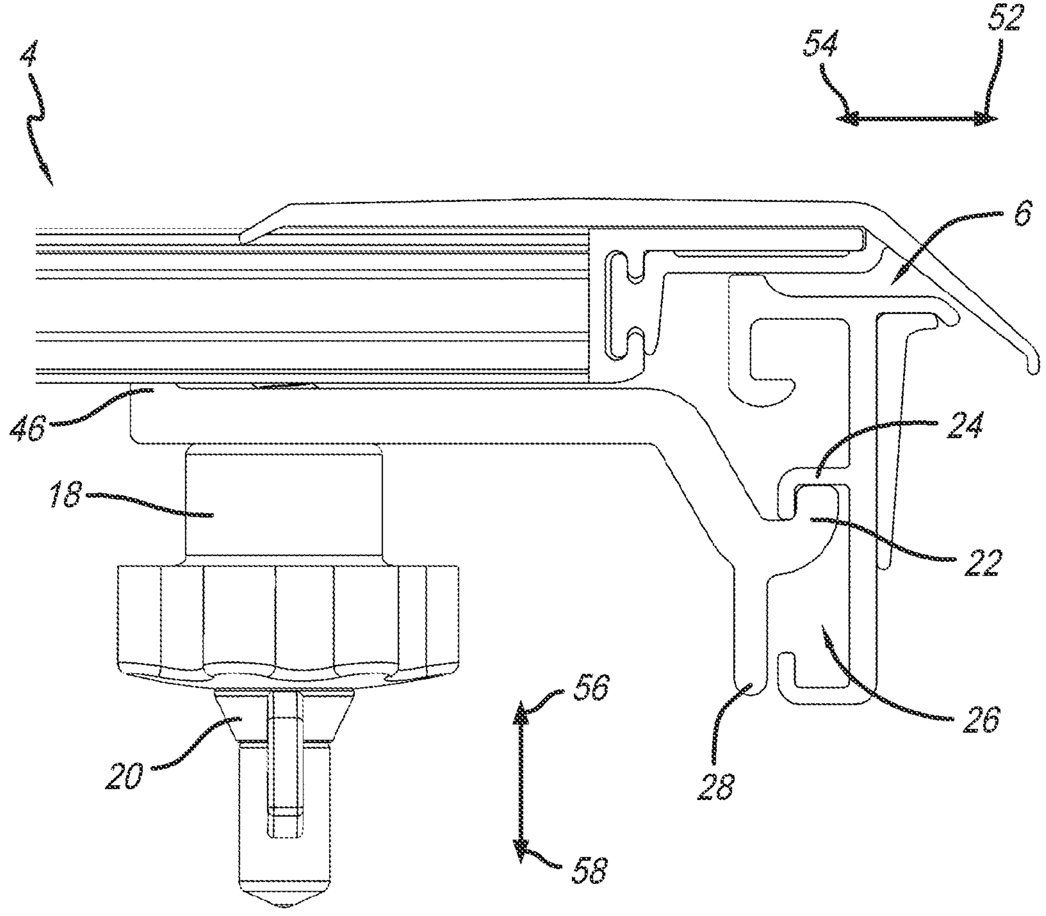
FIG. 7 is another front detail view of a portion of the bulkhead panel and rail of the tonneau cover assembly.

Front detail perspective views of a portion of bulkhead panel 4 depicting the progression of clamp 10 moving from its unclamped to clamped positions are shown in FIGS. 5, 6, and 7. The view in FIG. 5 depicts bulkhead panel clamp member 10 suspended from bulkhead panel 4 via fastener post 12 and knob 18 prior to engagement with rail 6. In FIG. 6, bulkhead panel clamp member 10 is moved further towards rail 6 in direction 52. Support for bulkhead panel clamp member 10 is still being provided by bulkhead panel 4. Bulkhead panel clamp member 10 is further moved toward rail 6 in direction 52 and into clamp slot 26 as shown. Once clamp hook 22 is located sufficiently in clamp slot 26, knob 18 can be rotated to move the bulkhead panel clamp member 10 nearly in direction 56 toward bulkhead panel 4 as shown in FIG. 7. Clamp hook 22 engages rail hook 24, thereby clamping bulkhead panel 4 to rail 6. By rotating knob 18 in the opposite direction and moving it away from bulkhead panel 4 in direction 58, bulkhead panel clamp member 10 is loosened and moved in direction 54 away from bulkhead panel 4 and un-clamping bulkhead panel clamp member 10 from rail 6. It is further appreciated that bulkhead panel 4 will again support the bulkhead panel clamp member 10 when it unclamps from rail 6.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional patent application that may differ from the priority application, then the disclosure from this non-provisional patent application controls.

What is claimed:

1. A bulkhead panel clamp for a tonneau cover assembly, the bulkhead panel clamp comprising:

a clamp body with a hook located at one end of the clamp body;

a flange located adjacent to and extends in an opposite direction of the hook; and a tab located on the clamp body spaced apart from the hook;

wherein the tab extends from a planar surface of the clamp body;

wherein the tab extends away from the clamp body that is in a direction opposite from the flange;

wherein the hook is configured to engage a rail and the clamp body is configured to be supported by a bulkhead panel portion of the tonneau cover assembly when the bulkhead panel clamp is in an unclamped position; and wherein the tab engages an underside of the bulkhead panel portion when the bulkhead panel clamp is in a clamped position to create space between the planar surface of the clamp body and the underside of the bulkhead panel portion.

2. The bulkhead panel clamp of claim 1, further comprising a post that extends through the clamp body and is configured to be supported by the bulkhead panel portion of the tonneau cover assembly when in the unclamped position.

3. The bulkhead panel clamp of claim 1, wherein the flange extends downwardly away from an underside of the bulkhead panel portion and underneath the hook to limit lateral movement of the clamp body.

4. The bulkhead panel clamp of claim 2, further comprising a threaded member that threads onto the post and supports the clamp body when the bulkhead panel clamp is in the unclamped position.

5. The bulkhead panel clamp of claim 4, wherein the threaded member is selected from the group consisting of a knob and a nut.

6. The bulkhead panel clamp of claim 4, further comprising a wingnut that threads onto the post adjacent the threaded member.

7. A bulkhead panel clamp for a tonneau cover assembly, the bulkhead panel clamp comprising:

a clamp body with a hook located at one end of the clamp body and a bore disposed through a planar portion of the clamp body;

a post with a longitudinally extending threaded body and a head at one end of the longitudinally extending threaded body that is wider than the longitudinally extending threaded body;

wherein the longitudinally extending threaded body of the post extends through the bore of the clamp body;

a knob with a threaded bore corresponding to threads on the longitudinally extending threaded body of the post;

wherein the knob rotates on the longitudinally extending threaded body of the post to move linearly along the longitudinally extending threaded body of the post;

wherein the head of the post is configured to be received in an opening formed within an underside of a bulkhead panel;

wherein the knob is configured to move the clamp body either toward or away from the underside of the bulkhead panel;

a flange located adjacent to and extends in an opposite direction of the hook; and a tab located on the clamp body spaced apart from the hook;

wherein the tab extends from a planar surface of the clamp body;

wherein the tab extends away from the clamp body that is in a direction opposite from the flange; and wherein the tab engages the underside of the bulkhead panel when the bulkhead panel clamp is in a clamped position to create space between the planar portion of the clamp body and the underside of the bulkhead panel.

8. The bulkhead panel clamp of claim 7, wherein the hook is configured to engage a rail and the clamp body is configured to be supported by a bulkhead panel portion of the tonneau cover assembly when the bulkhead panel clamp is in an unclamped position.

9. The bulkhead panel clamp of claim 7, wherein the flange extends downwardly away from the underside of the bulkhead panel and underneath the hook to limit lateral movement of the clamp body.

* * * * *